United States Patent [19]
Nakamura et al.

[11] 4,297,014
[45] Oct. 27, 1981

[54] CAMERA FOCUS DETECTING DEVICE

[75] Inventors: Kazuo Nakamura, Shiki; Masao Jyojiki, Tsurugashima; Harumi Aoki, Kiyose, all of Japan

[73] Assignee: Asahi Kogaku Kogyo Kabushiki Kaisha, Tokyo, Japan

[21] Appl. No.: 117,921

[22] Filed: Feb. 4, 1980

[30] Foreign Application Priority Data

Feb. 14, 1979 [JP] Japan .................................. 54-15904

[51] Int. Cl.³ .......................... G03B 3/10; G03B 13/18
[52] U.S. Cl. ........................................ 354/25; 354/31; 354/195; 250/209
[58] Field of Search .................. 354/25, 195, 31; 250/204, 201, 214 P; 350/46; 352/140; 355/56

[56] References Cited
U.S. PATENT DOCUMENTS
4,005,443   1/1977   Albrecht .............................. 354/25

*Primary Examiner*—L. T. Hix
*Assistant Examiner*—Stafford D. Schreyer
*Attorney, Agent, or Firm*—Sughrue, Mion, Zinn, Macpeak & Seas

[57] ABSTRACT

An automatic focus detecting device for a camera including a self-scanning type photoelectric conversion element array. The array is operated in two modes, a brightness detecting mode and a focus detecting mode. In the brightness detecting mode, the individual light detecting elements are connected in parallel with one another and to a brightness detection module. Once the brightness detection has been made, the scanning frequency of the array is set in accordance with the brightness value detected. The photodiode elements are then coupled in serial fashion to a focus detecting module. The position of the lens is varied until the focus detecting module indicates that the proper focalization position has been reached.

9 Claims, 14 Drawing Figures

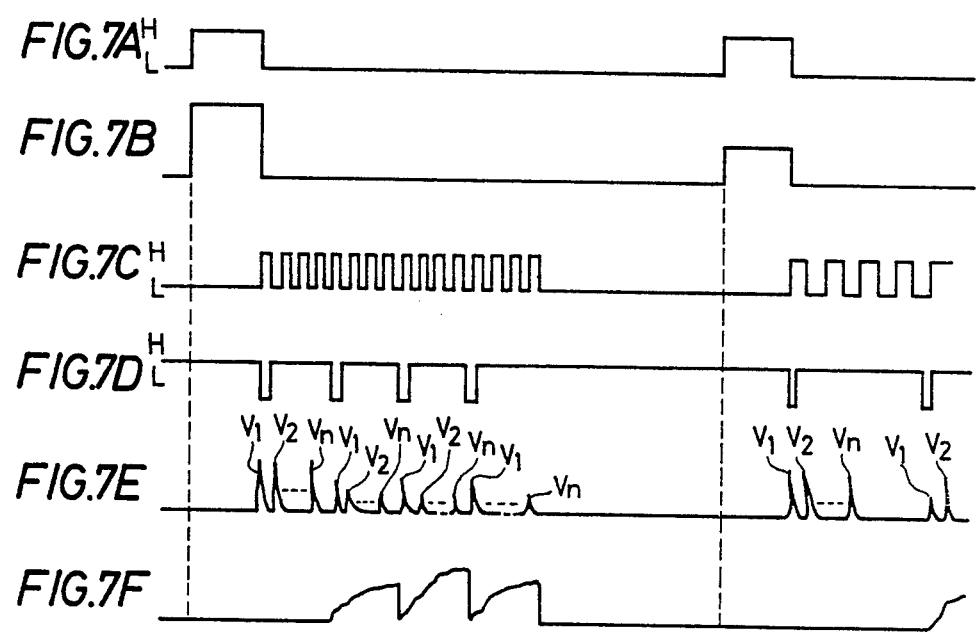
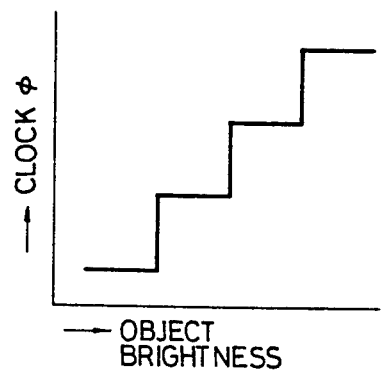
FIG. 8
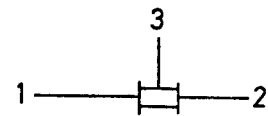
FIG. 9

CAMERA FOCUS DETECTING DEVICE

BACKGROUND OF THE INVENTION

This invention relates to a focus detecting device for a camera which is capable of detecting focalization over a wide range of brightness of an object to be photographed. It is also desirable that the device be applicable to a detecting technique utilizing a so-called image coincidence principle in which the image of an object is divided into two parts which are brought into coincidence with each other at the time of focalization and to an automatic focus detecting device utilizing a principle that the contrast of the image of an object becomes a maximum at the point of focalization.

A number of automatic focus detecting devices utilizing the principle of image coincidence effected with plural photoelectric conversion elements and in which variations in contrast of an object to be photographed are sensed have been proposed in the art. Some of these have been put into practice commercially. CdS elements were earlier employed as photoelectric conversion elements although presently photodiodes are favored. In a recently available photoelectric conversion element, the number of output terminals has been reduced as has been the area needed for light receiving. Accordingly, a number of photoelectric conversion elements can be formed on one substrate. Because of this, the present tendency is to use self-scanning type photoelectric conversion element groups utilizing a CCD or BBD principle or MOS type photoelectric conversion element groups using MOS type shift registers which can be formed as a single unit with a processing circuit with a high degree of integration.

However, since the self-scanning type photoelectric conversion element group operates utilizing the discharge phenomenon of the elements, for a fixed discharge time it can provide an output only for a small range of brightness. In order to increase the range of brightness for the output of the self-scanning type photoelectric conversion element group to make it suitable for use over a wide range of brightness of an object to be photographed, it is necessary to vary the discharge time. That is, it is necessary to vary the drive frequency or the time of each scanning period according to the brightness of the object. This variation operation is referred to hereinafter as "brightness modulation". Accordingly, it is necessary to provide both a photoelectric conversion element for measuring the brightness of an object, namely, a photoelectric conversion element for brightness modulation and a photoelectric conversion element, corresponding to the above-described self-scanning type photoelectric conversion element group, for determining information required for automatic focus detection. This operation is referred to hereinafter as "brightness detection". Accordingly, it is also required to provide an optical system and an optical member such as a half-silvered mirror in order to project the image of an object onto both of the elements. If the photoelectric conversion element for brightness modulation is provided near the photoelectric conversion element group for brightness detection, then it is unnecessary to provide an optical member such as a half-silvered mirror. However, this method is disadvantageous in that the identical image of an object is not projected onto both and therefore brightness modulation which does not correspond precisely to the brightness of the object is provided to the photoelectric conversion element group which performs the brightness detection with the result that the output is not accurate.

Accordingly, an object of the present invention is to provide a focus detecting device for camera in which a self-scanning type photoelectric conversion element group is used for both brightness detection and brightness modulation so as to eliminate the above-described difficulties and in which focus detection can be carried out over a wide range of brightness of an object to be photographed even for low illumination. It is also an object of the invention to provide a focus detecting device which aids in miniaturization of the device.

SUMMARY OF THE INVENTION

These, as well as other objects of the invention, are met in accordance with the invention by an automatic focus detecting device for a camera having a self-scanning type photoelectric conversion element including a switching circuit for switching a self-scanning type photoelectric conversion element array between brightness detection and brightness modulation modes, circuit means for determining an average value of brightness during times of brightness modulation with the circuit means operating as a static type photoelectric conversion element, means for switching the self-scanning type photoelectric conversion element array at the start of the focus detection operation so that each element is independently and serially connected for brightness modulation, means for converting an output of the switching means to a signal having a variable drive frequency which is coupled to the self-scanning type photoelectric conversion element to effect scanning therein, and focus detection processing means for controlling a drive circuit of a photographing lens thereby to perform focus detection in response to outputs of the self-scanning type photoelectric conversion element group.

Moreover, the objects of the invention may also be met by an automatic focus detecting device including a self-scanning type photoelectric conversion element array, brightness detecting means, focus detecting means, switch means for coupling outputs of photodiode elements of the array in parallel and to the brightness detecting means for performing a brightness detection operation and alternatively in serial fashion to the focus detecting means, and means for varying a scanning frequency of the array in response to an output of the brightness detecting means.

BRIEF DESCRIPTION OF THE DRAWINGS

FIGS. 7A-7F are a series of waveforms indicating variations with time of outputs at various points in the circuit shown in FIG. 6.

FIG. 8 is a graphical representation for a description of an example of brightness modulation according to the invention.

FIG. 9 is a schematic diagram illustrating an example of a semiconductor switch shown in FIG. 6.

DESCRIPTION OF THE PREFERRED EMBODIMENTS

The invention will be described with reference to the accompanying drawings.

Figure 1:
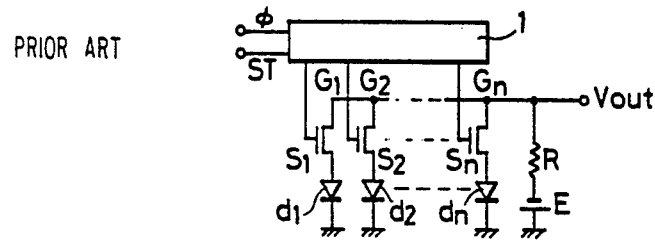
FIG. 1 is a circuit diagram, partly as a block diagram, showing an example of a focus detecting device using an MOS type shift register in a self-scanning type photoelectric conversion element group.

FIG. 1 is a circuit diagram showing an example of a focus detecting device using an MOS type shift register in a self-scanning type photoelectric conversion element group. A scanning circuit 1 including a shift register is driven by a clock pulse signal $\phi$ and a start pulse ST in such a manner that semiconductor address switches $S_1$, $S_2$, ... and $S_n$ are successively turned on by way of signals applied from output terminals $G_1$, $G_2$, ... and $G_n$.

The operating principle of the circuit shown in FIG. 1 will be briefly described in conjunction with photodiode $d_2$ by way of example. When the address switch $S_2$ is turned on by a scanning pulse applied through the output terminal $G_2$ by the scanning circuit 1, the photodiode is reverse biased by an external supply voltage E and a load resistor R and the internal capacitance of the photodiode $d_2$ is charged to the photodiode's saturation voltage. When the address switch $S_2$ is turned off by a signal applied through the output terminal $G_2$, the photodiode $d_2$ is reverse biased for one scanning period. When light is applied to the photodiode $d_2$ in this state, a discharge current flows in the photodiode $d_2$ as a result of which the amount of charge stored in the photodiode $d_2$ decreases in proportion of the quantity of light applied thereto. The charge thus reduced is replenished when the switch $S_2$ is next turned on. The charge current thus produces a video output $V_{out}$. If the scanning period time is increased, that is, the duration of the start pulse is increased, the circuit operates even for low levels of illumination. In this manner, the apparent sensitivity of the device is increased so that focus detection for low illumination conditions can successfully be carried out.

Figure 2:
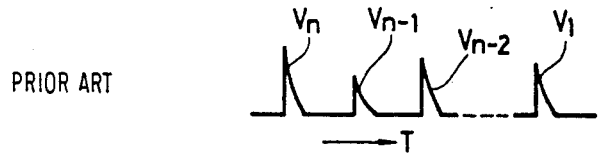
FIG. 2 is a diagram showing variations with time of an output signal of the circuit shown in FIG. 1.

FIG. 2 shows variations with time of the video output $V_{out}$ in FIG. 1. When the semiconductor address switches $S_1$ through $S_n$ are activated one after another, then outputs $V_1$, $V_2$, ... and $V_n$ are successively provided to form the video output $V_{out}$. It goes without saying that the waveform of each output is a charging waveform.

Figure 3:
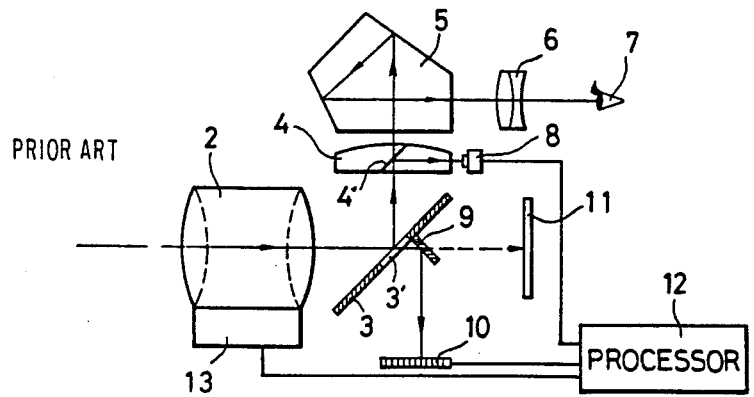
FIG. 3 is an explanatory diagram showing an example of a single-lens reflex camera with an ordinary automatic focus detecting device.

FIG. 3 illustrates an example of a single-lens reflex camera in which an ordinary focus detecting device is employed. Fundamentally, the arrangement of the camera is such that a self-scanning type photoelectric conversion element group is employed for detecting the contrast of an object to be photographed to perform focus detection. As shown in FIG. 3, light from an object to be photographed passes through a photographing lens 2 and is then reflected by a total reflection mirror 3. The image of the object is formed below a condenser lens 4. The image of the object is observed through a pentaprism 5 and a magnifier 6 by an eye 7 of the operator, and the image is projected through a half-silvered mirror 3' and a total reflection mirror 9 onto a self-scanning type brightness detecting photoelectric conversion element group 10 hereinafter referred to merely as "a detecting element 10" when applicable. When the mirror is lifted, light from the object is projected onto a film plane 11.

As described above, it is necessary for the detecting element 10 to determine the time required for a single scanning period according to the brightness of an object to be photographed. For this purpose, light corresponding to the object's image projected onto the detecting element 10 is applied to a brightness modulating photoelectric conversion element 8 hereinafter referred to merely as "a modulating element 8" when applicable by a half-silvered mirror 4' provided at the central portion of the condenser lens 4. The output of the modulating element 8 is applied to a processing circuit 12 which controls the detecting element 10.

Next, the focus detecting operation will be described. The output of the modulating element 8 is applied to the processing circuit 12 where it is converted into a frequency variable signal of which the frequency is set so as to provide a suitable scanning period for the detecting element 10, that is, to determine the time interval between the start pulses ST. Thereafter, the photographing lens 2 is moved in one direction from the closest focusing distance or the infinity distance ($\infty$) by a photographing lens driving circuit 13.

The following calculation is then carried out using the outputs $V_1$, $V_2$, ... and $V_n$ (FIG. 2) of the detecting element 10:

$$\epsilon = \sum_{i=1}^{n-1} | V_i - V_{i+1} | .$$

The value of this calculation has its maximum at the point of focalization. That is, the fact that the contrast becomes the highest at the point of focalization is utilized for the focus detecting operation. The calculation is carried out in the processing circuit 12. When the output $\epsilon$ becomes a maximum, the movement of the photographing lens is halted by the photographing lens driving circuit 13 at which time focalization has been properly achieved.

Figure 4:
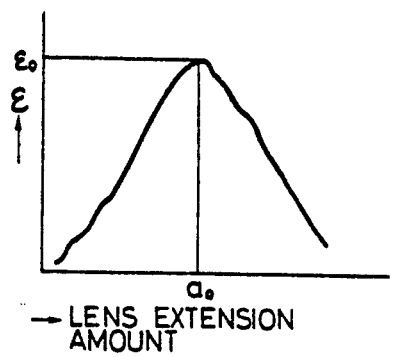
FIG. 4 is a graphical representation indicating an ordinary focus detection output.

FIG. 4 shows variations of the focus detection output $\epsilon$ with respect to the amount of extension of the photographing lens. As is clear from FIG. 4, when the amount of extension of the photographing lens is $a_O$ (the focalization position) the focus detection output $\epsilon$ reaches its maximum value $\epsilon_O$.

Figure 5:
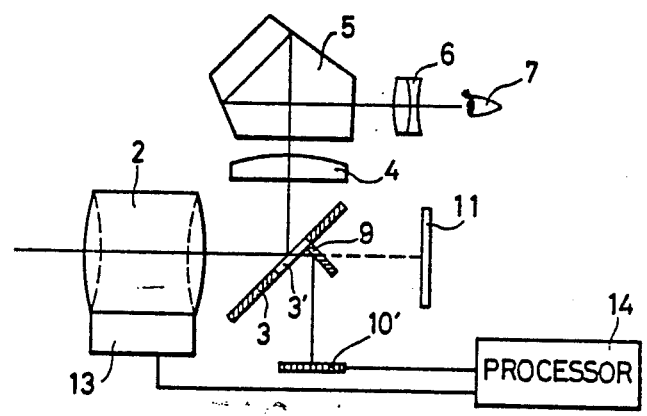
FIG. 5 is an explanatory diagram showing an example of a focus detecting device according to the invention.
Figure 6:
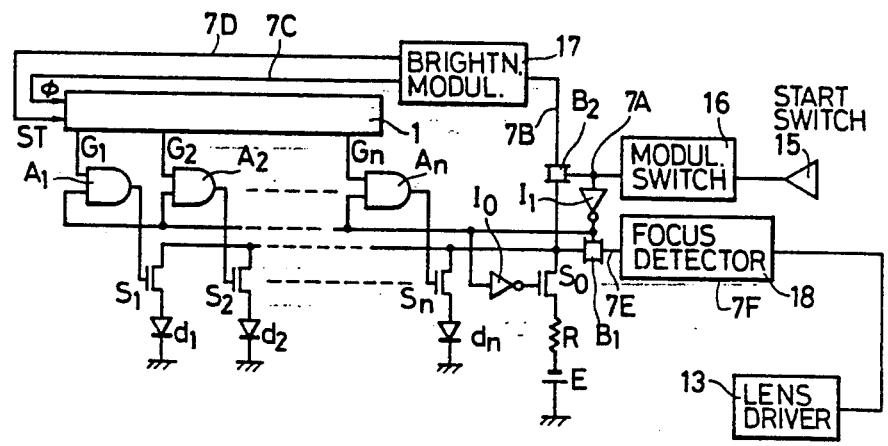
FIG. 6 is a circuit diagram, partly as a block diagram, showing an example of an electrical circuit in a focus detecting device according to the invention.

FIG. 5 is a diagram of a preferred embodiment of a focus detecting device according to the present invention in which the principle of the focus detecting device shown in FIG. 3 is employed. As is clear from comparing FIGS. 3 and 5, no modulating element (8 in FIG. 3) is used in the device shown in FIG. 5 and, accordingly, it is unnecessary to provide the half-silvered mirror 4' in the condenser lens 4. Thus, the arrangement of the device is FIG. 5 is very simple. In the device in FIG. 5, a brightness detecting and modulating self-scanning type photoelectric conversion element group 10', hereinafter referred to merely as a detecting and modulating element 101 when applicable, is employed instead of the detecting element 10 in FIG. 3 and a processing circuit 14 somewhat different from the processing circuit 12 in FIG. 3 is used. The remaining components are optically similar to those in FIG. 3. Thus, the present invention can be applied to any focus detecting technique based on any principle utilizing a self-scanning type photoelectric conversion element group.

The detecting and modulating element 10' and the processing circuit 14 in the device according to the invention will be described with reference to FIGS. 6 and 7A–7F. A line of division between the detecting and modulating element 10' and the processing circuit 14 is not indicated because the two are combined.

First the procedure for automatic focus detection will be described. When the automatic focus detecting mechanism is started by an automatic focus detection start switch 15, a brightness detection and modulation switch circuit 16 applies a high logic level signal to a semiconductor switch $B_2$ and to a semiconductor switch $B_1$ through an inverter $I_1$ for a period of time as indicated in FIG. 7A. In the semiconductor switches, which are shown diagrammatically in FIG. 9, when the terminal 3 is at "H", a conductive or ON state is established between the terminals 1 and 2 and, when the terminal 3 is at a low logic level "L", a non-conductive or OFF state is established between the terminals 1 and 2. Accordingly, the semiconductor switch $B_2$ is rendered conductive and the semiconductor switch $B_1$ is rendered non-conductive. The outputs of AND circuits $A_1, A_2, \ldots$ and $A_n$ are set to "L" irrespective of the logic levels of the output terminals $G_1, G_2, \ldots$ and $G_n$ of a scanning circuit 1. Therefore, while semiconductor address switches $S_1, S_2, \ldots$ and $S_n$ are turned ON, a semiconductor switch $S_O$ is turned OFF by means of an inverter $I_O$, it being assumed that the semiconductor address switches $S_1, S_2, \ldots S_n$ and $S_O$ are rendered conductive by "L" signals. Accordingly, no reverse bias is applied to photodiodes $d_1, d_2, \ldots$ and $d_n$ via switch $S_O$.

While the switches $S_1, S_2, \ldots S_n$ are commonly conducting, current corresponding to the composite brightness of the object to be photographed flows in a video line (with the photodiodes $d_1, d_2, \ldots$ and $d_n$ connected in parallel) and an input signal as indicated in FIG. 7B is applied through the semiconductor switch $B_2$ to brightness modulation circuit 17, the above-described operation being referred to as "a static type operation". In the circuit 17, the input signal is converted to a variable frequency signal, and a clock pulse $\phi$ and a start pulse ST as indicated in FIGS. 7C and 7D, respectively, are applied to the scanning circuit 1. At the same time, the output of the brightness detection and modulation switching circuit 16 is set to "L". As a result, the semiconductor switch $B_2$ is rendered non-conductive, the semiconductors switches $B_1$ and $S_O$ are rendered conductive, and the logic levels of the outputs of the AND circuits $A_1$ through $A_n$ become the same as those at the output terminals $G_1$ through $G_n$. Thus, output signals as indicated in FIG. 7E in proportion to the quantities of light applied to the photodiodes $d_1$ and $d_n$ are successively applied through the video line to a focus detecting circuit 18.

At the same time, the photographing lens 2 in FIG. 5 is moved in one direction from the closest focusing distance or the infinity distance ($\infty$) by a photographing lens driving device 13. In the focusing detecting circuit 18, the above-described equation $$\epsilon = \sum_{i=1}^{n-1} |V_i - V_{i+1}|$$

is calculated using the video outputs $V_1, V_2, \ldots$ and $V_n$ which are successively provided and the maximum value $\epsilon_O$ of the focus detection output $\epsilon$ is detected. The detected information is applied to the photographing lens driving device 13 to halt the movement of the photographing lens 2 at the point of proper focalization. FIG. 7F shows the waveform corresponding to the integration calculation in the focus detecting circuit 18.

FIG. 8 shows a waveform for a description of an example of a brightness modulation technique which can be used with the invention. With this technique, the frequency of the clock pulse signal, that is, the scanning period, is changed stepwise corresponding to the brightness of an object to be photographed. The scanning period time is changed stepwise in correspondence with the average value in brightness of the image of an object projected onto the detecting and modulating element 10' in the example of the device according to the invention. The correspondence may be such that weight is given to the average value, that is, any correspondence can be employed if it provides an output at the time of the detection operation of the detecting and modulating element 10'. However, a technique in which the frequency is changed linearly may be employed. Furthermore, for the brightness modulation, any combination such as for instance one modulation operation for each ten detection operations may be employed.

As is apparent from the above description, in the focus detecting device according to the invention, in comparison with prior art constructions two photoelectric conversion elements for detection and modulation have been replaced by a single element. Moreover, it is unnecessary to provide an optical system and optical member for the modulating element while yet focus detection is successfully executed over a wide illumination range, even for low illumination. Accordingly, the technical concept of the focus detecting device according to the invention is applicable to any focus detecting device utilizing a self-scanning type photoelectric conversion element.

While the invention has been described in detail and with reference to specific embodiments thereof, it will be apparent to one skilled in the art that various changes and modifications can be made therein without departing from the spirit and scope thereof.

What is claimed is:

1. An automatic focus detecting device for a camera having a self-scanning type photoelectric conversion element comprising: a switching circuit for switching a self-scanning type photoelectric conversion element array for brightness detection and brightness modulation; circuit means for determining an average value of brightness at the time of brightness modulation operating as a static type photoelectric conversion element; means for switching said self-scanning type photoelectric conversion element array at the start of focus detection to independent connections for brightness modulation; means for converting an output of said switching means to a signal having a variable drive frequency, said signal being coupled to said self-scanning type photoelectric conversion element wherein said self-scanning type photoelectric conversion element array is switched to a parallel connection for brightness detection so that said self-scanning type photoelectric conversion element group is driven by said signal having a variable drive frequency; and focus detection processing means for controlling a drive circuit of a photographing lens thereby to perform focus detection in response to outputs of said self-scanning type photoelectric conversion element group.

2. A device as claimed in claim 1 wherein said brightness modulation and brightness detection are alternately carried out.

3. A device as claimed in claim 1 wherein said brightness modulation is carried out once in every several to several tens of brightness detections.

4. A device as claimed in claim 1 further comprising means for weighting a brightness modulation output.

5. A device as claimed in either of claims 1 or 2 wherein the relation of a brightness modulation output and one scanning period of said self-scanning type photoelectric conversion element group is varied stepwise.

6. An automatic focus detecting device comprising: a self-scanning type photoelectric conversion element array; brightness detecting means; focus detecting means; switch means for coupling outputs of photodiode elements of said array in parallel and to said brightness detecting means for a brightness detection operation and alternately in serial fashion to said focus detecting means; and means for varying a scanning frequency of said array in response to an output of said brightness detecting means.

7. The focus detecting device of claim 6 wherein said switching means comprises: a plurality of AND gates each having one input coupled to an output of a scanning circuit of said array and a second input coupled in common with each of the second inputs of said AND gates; a first plurality of electronic switch means each of which has a control input coupled to an output of one of said AND gates and having one switch terminal coupled to one of said photodiode elements and a second switch terminal coupled in common with each of the second switch terminals of said first plurality electronic switch means; means for producing a control signal in response to a start switch; a second electronic switch means having a control input coupled to receive said control signal and having one switch terminal coupled to an input of said brightness detecting means and a second switch terminal coupled to said commonly coupled second switch terminals of said first plurality of electronic switches; an inverter having an input coupled to receive said control signal and an output coupled to said commonly coupled second inputs of said AND gates; and a third electronic switch means having one switch terminal coupled to said second switch terminal of said second electronic switch means, a second switch terminal coupled to an input of said focus detecting means and a control input coupled to said output of said inverter.

8. The focus detecting device of claim 7 further comprising: a second inverter having an input coupled to said output of said first inverter; a fourth electronic switch means having first a switch terminal coupled to said second switch terminal of said second electronic switch means and a second switch terminal coupled to a biasing source.

9. The focus detecting device of claim 6, 7, or 8 further comprising: means for positioning a camera lens in response to an output of said focus detecting means.